July 5, 1938.  E. SANTONI  2,122,870
AUTOMATIC AEROPHOTOGRAPHIC CAMERA WITH A ROTARY ANNULAR PLATE MAGAZINE
Filed June 13, 1934  4 Sheets-Sheet 1

Ermenegildo Santoni
INVENTOR
his ATTY.

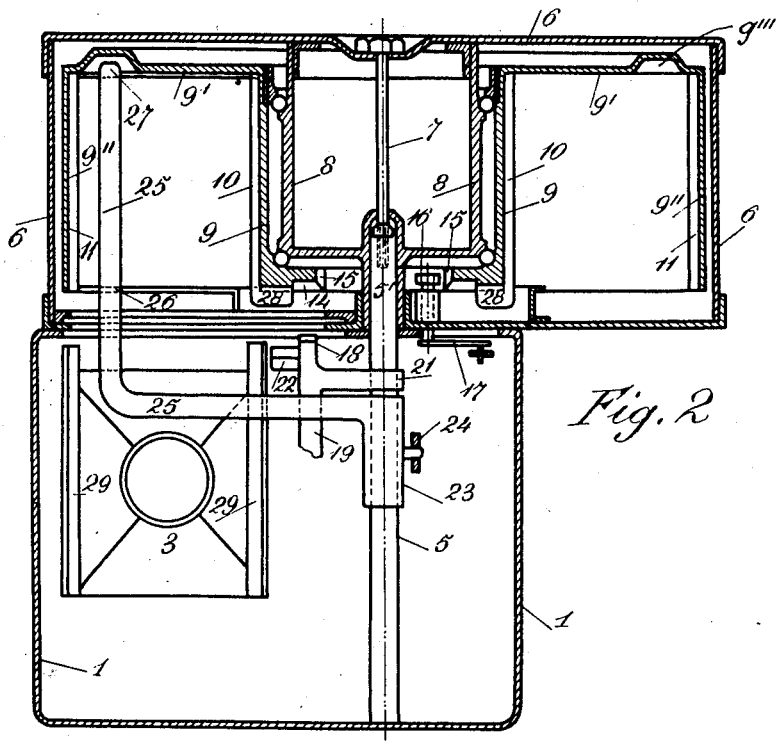

July 5, 1938.  E. SANTONI  2,122,870
AUTOMATIC AEROPHOTOGRAPHIC CAMERA WITH A ROTARY ANNULAR PLATE MAGAZINE
Filed June 13, 1934   4 Sheets-Sheet 3

Ermenegildo Santoni
INVENTOR

July 5, 1938.  E. SANTONI  2,122,870
AUTOMATIC AEROPHOTOGRAPHIC CAMERA WITH A ROTARY ANNULAR PLATE MAGAZINE
Filed June 13, 1934   4 Sheets-Sheet 4
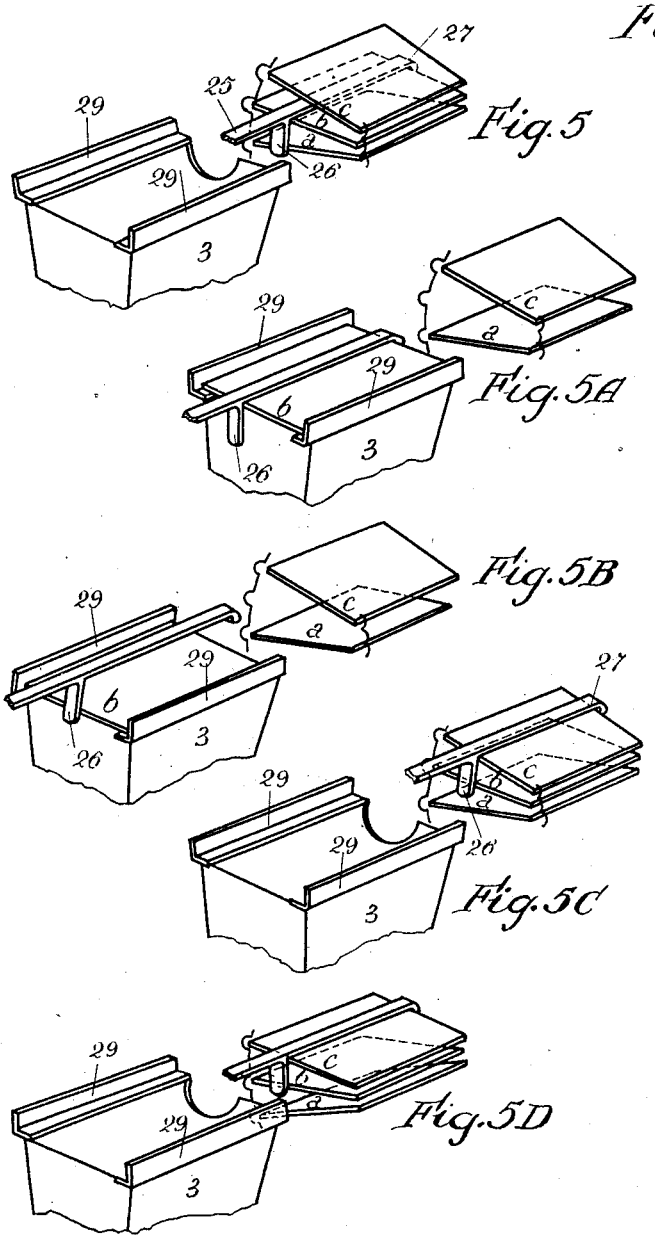
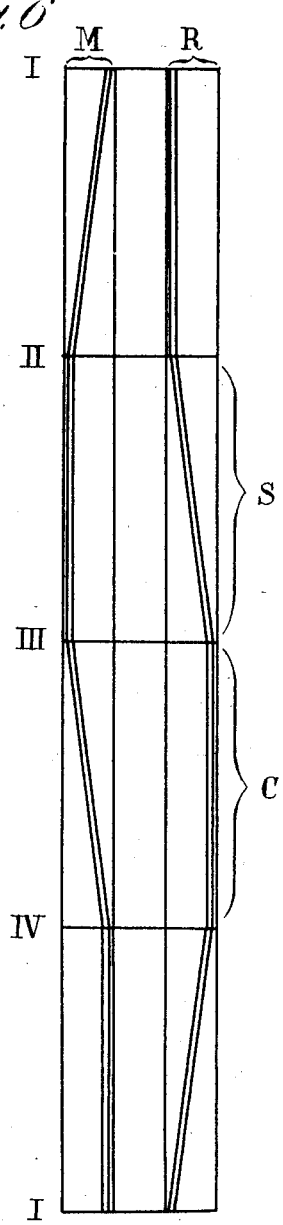
Ermenegildo Santoni
INVENTOR
By Ottinger
his ATTY.

Patented July 5, 1938

2,122,870

UNITED STATES PATENT OFFICE 2,122,870

AUTOMATIC AEROPHOTOGRAPHIC CAMERA WITH A ROTARY ANNULAR PLATE-MAGAZINE

Ermenegildo Santoni, Florence, Italy

Application June 13, 1934, Serial No. 730,437
In Italy July 4, 1933

9 Claims. (Cl. 95—19)

This invention relates to a new and improved quick-loading camera which is particularly adapted for aerophotography.

Various types of automatic cameras for use in aeroplanes have been known. Some of these cameras are provided with a control mechanism which, as a rule, is rotatable about an axis and which successively delivers the photographic plates from a magazine into the focal plane of the camera. After exposure the individual plates are withdrawn and placed either into a separate storage box or returned to the plate magazine. In the latter case, the magazine is given a translatory movement in a vertical direction with respect to the face of the plate. The purpose of this movement is to present the next plate to the feeding mechanism which delivers and withdraws the plate from and to the camera. As a rule, each photographic plate is kept in a metal frame provided with some kind of fastening means such as hooks, grooves, projections or the like which may be engaged by the feeding mechanism. In these constructions the plates are generally disposed in the storage box in parallel relation with respect to one another. The operation of these cameras is rather slow and represents many disadvantages well known to persons skilled in the art.

The principal object of the present invention is to overcome the disadvantages inherent in the devices above described.

Thus, it is an object of the present invention to permit of very rapid exchange of plates.

Another object of the invention is to provide a camera which may be easily handled and requires but a minimum of space.

With these and other objects in view which will become more apparent from the following, I obtain the foregoing results by the special arrangement of parts and means described in the following specification and illustrated in the accompanying drawings.

Briefly stated, the present invention consists of a camera provided with a magazine from which the plates are removed and to which the same are returned after exposure. A particular feature of this construction resides in the circular construction of the magazine. The latter has the shape of a cylindrical drum and the plates are radially disposed inside said drum which is provided with plate retaining means. The cylinder is provided with a slot which registers with a corresponding slot in the camera body. The individual plates are withdrawn from the cylinder by means of a special extractor which slides the plates through said slots into the camera. After exposure, the extractor returns each plate to its original place in the drum and engages the next following plate. Concurrently therewith, the drum is rotated and the next following plate brought into position for withdrawal from the magazine. Thereafter the operation is repeated.

It should be noted that a particular advantage of this construction resides in the fact that simple and ordinary plates are removed from the magazine and delivered to the camera whence they are returned to the magazine. The plates are not provided with frames, supporting hooks or the like. The fact that the magazine is circular makes it possible to perform very rapid exchange of plates. Another advantage of the circular magazine is its compact form, which makes it possible to store a great number of plates in a comparatively limited area. The camera according to the present invention is also much lighter in weight and its rotary movement assures even and balanced operation.

My invention is illustrated by way of example in the accompanying drawings in which:—

Fig. 2 is a horizontal section of the device taken along lines 2—2 of Fig. 1 of the drawings;

Figs. 3, 3A and 3B show details of a modified form of the stretching mechanism used in connection with the plate retaining means of the magazine;

Figs. 5, 5A, 5B, 5C and 5D show various operating stages of the extractor;

Fig. 6 illustrates diagrammatically the shape of the cams employed for synchronizing the operation of the extractor and the magazine.

Figure 1:
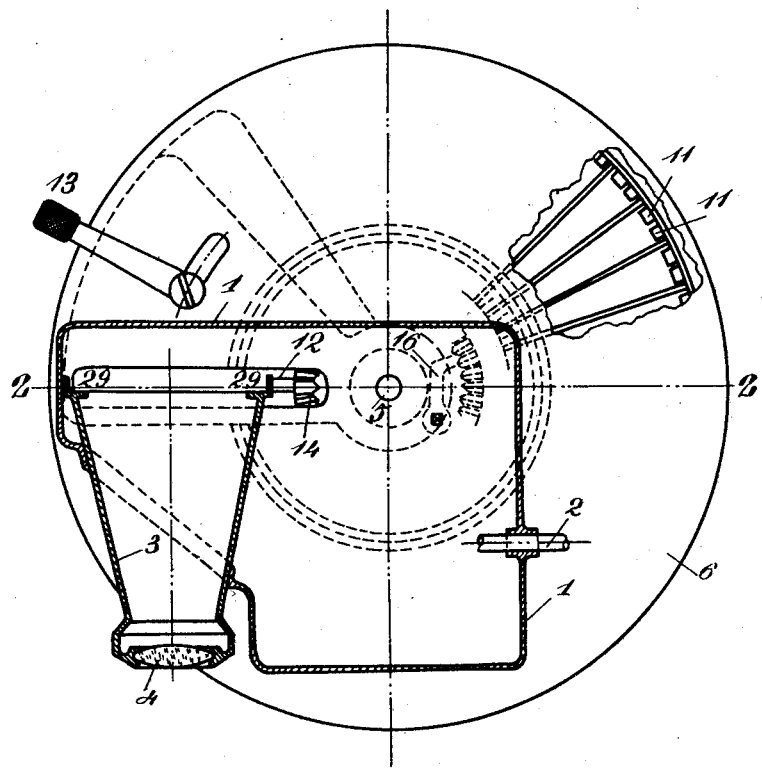
Fig. 1 is a vertical sectional view of the camera and magazine according to the present invention, the front wall of the magazine being partly broken away to indicate the position of the plates therein.
Figure 1A:
Fig. 1A is a detailed view of the plate retaining means in the magazine.

The device of the present invention comprises a casing 1 to which is attached the camera 3 provided with an objective 4 and a shutter 15. The casing 1 and camera 3 are solidly secured to the cylindrical magazine 6 by means of a stay-bolt 7 which is provided with fastening nuts at either end thereof. A cylinder 8 is centrally attached inside said casing 6 and surrounded by the cylindrical plate carrying casing 9, 9', 9", ball bearings being disposed between the cylinder 8 and the casing 9, 9', 9". The wall 9 of the plate carrying casing is provided with a plurality of axially disposed thin narrow blades 10 provided with lower extensions 28. The opposite wall 9" of the casing is provided with a plurality of similar blades 11 whose free ends, however, are tapered outwardly as shown in Fig. 1A in order to facilitate insertion of the photographic plates into the casing 9, 9', 9". The blades 10 are straight and parallel with respect to one another, and firmly support the photographic plates disposed therebetween. Both blades 10 and 11 are disposed axially and circumferentially within the plate carrying casing formed by the walls 9, 9', 9". The wall 9' is provided with a circumferential groove 9''' near its outer edge. The wall 9" is provided with double the number of blades disposed on wall 9. The photographic plates are held in position by means of said blades 10, 11 which support the same in the position shown in Fig. 1. The photographic plates are disposed radially so that each pair of plates is separated by but a single blade near the center of the drum, while they are separated by two blades on the periphery thereof (see Fig. 1). The cylinder 6 as well as the plate casing 9, 9', 9" and the camera casing 1 are provided with registering slots 12 for the insertion of the photographic plates. The inner cylinder 8 is rigidly connected to the stationary drum 6 while the plate casing 9, 9', 9" is rotatable about the cylinder 8 and provided at the lower inner end of wall 9 with two gears 14, 15 disposed at right angles to each other.

Figure 4:
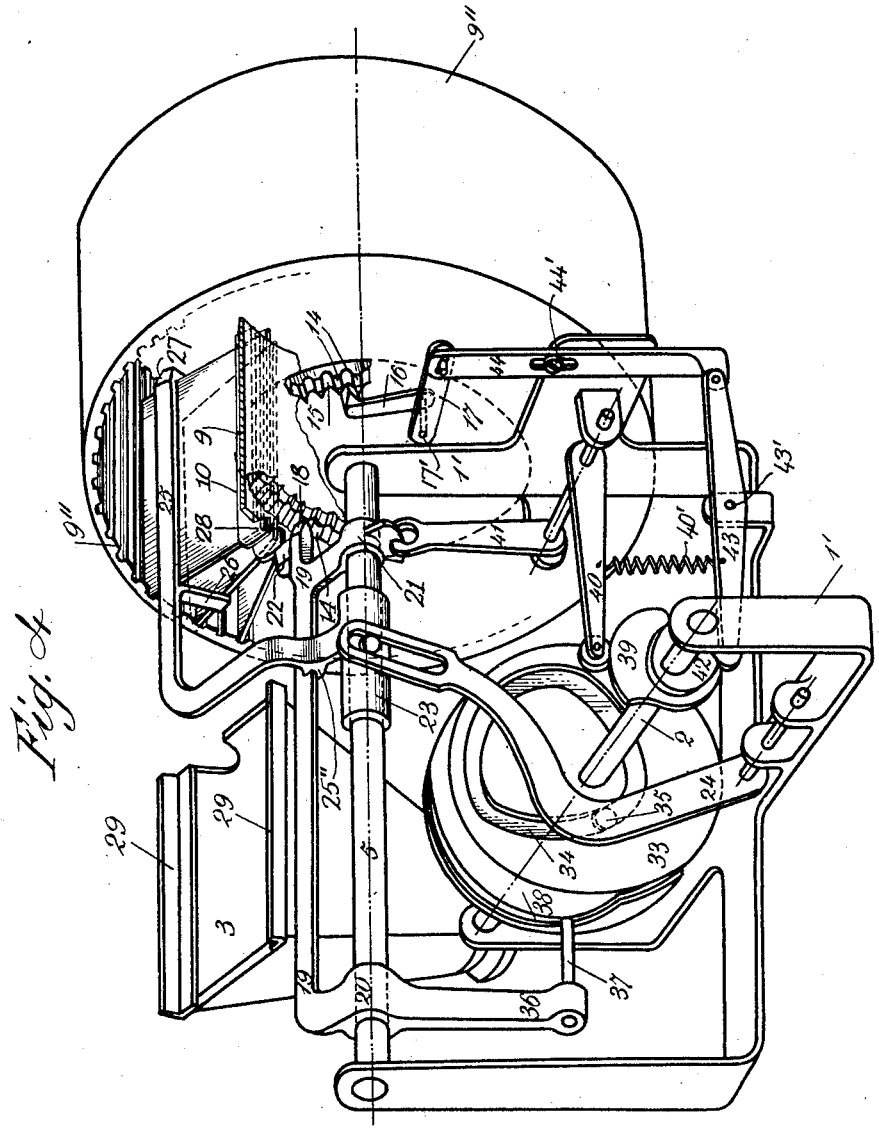
Fig. 4 is a perspective view of the operating mechanism of the plate extractor with some parts omitted and some parts broken away for the sake of clarity.

The actuating mechanism illustrated in Fig. 4 is disposed inside the camera casing 1. This mechanism consists of a stationary shaft 5 which is supported at one end by the casing 1 and at the other by the bearing 5' forming part of the stationary cylinder 8. A sleeve 23 carrying an arm 25 is slidably supported by said shaft. This arm 25 which serves as plate extractor is provided with a downward projection 26 and a finger 27 which is hingedly attached to the free end of arm 25. Said sleeve 23 carries a pin which is engaged by the slot provided on lever 24 which is swingably mounted in the casing, 1. The arm 25 representing the extractor projects from the casing 1 into plate casing 9, 9', 9" through the aligned openings 12 of the casing 1 and the cylinder 6, respectively. The finger 27 provided on arm 25 extends into the aforementioned peripheral groove provided in the wall 9' of the plate casing. The rear end of the camera is provided with guides 29 which are likewise disposed in alignment with said slots so that a plate may be extracted from the plate casing by means of extractor 25 and moved through said slots 12 right onto the guides 29. When the photographic plate rests on guides 29 it is focused and ready for exposure, the light sensitive surface of the plate facing towards the objective. The plates are extracted from the plate casing 9, 9', 9" when the arm 25, shown in Fig. 4, is moved from the right to left. This movement is controlled by lever 24. The latter is guided by the pin 35 which follows the cam groove 34 provided in the cam 33 which is mounted on the driving shaft 2. This shaft 2 is rotatably disposed in the casing 1. The arm 19 actuating the plate casing 9, 9', 9" is provided with sleeves 20 and 21, which are movably mounted on the shaft 5. The forward end 18 of the arm 19 is tooth-shaped and adapted to engage the gear 14. A lever 36 is integrally attached to the sleeve 20 of the arm 19. The lever 36 carries a pin 37 which is guided in a cam groove 38 of a cam mounted on the driving shaft 2. Rotation of this cam causes the lever 36, the sleeve 20 and the arm 19 to rotate about the shaft 5, whereby due to the engagement of element 18 with gear 14 of the plate casing 9, 9', 9", rotation of the latter is produced. The sleeve 21 is in operative engagement with lever 41 which is connected with a lever 40, which, in turn, is controlled by an eccentric 39 mounted on the shaft 2. The lever 40 is held in close engagement with the eccentric 39 by means of a spring 40' as shown in Fig. 4. Movement of the eccentric 39 produces rocking motion of levers 40, 41 causing the sleeve 21 and with it the arm 19, the sleeve 20, lever 36 and the pin 37 to move axially with respect to the shaft 5. Thus, the tooth provided at the forward end of the arm 19 is brought into and out of engagement with the gear 14 provided on the plate carrying casing 9, 9', 9". Operative engagement between arms 19 and 25 is produced by means of a groove 25" provided on the arm 25. Regular rotation of the plate carrying casing 9, 9', 9" is insured by means of gear 15 gearing in alternation with pawl 16. The latter is actuated by the intermediate lever 17 which is rotatable about 17' and controlled by the lever 43 and the draw-rod 44. The lever 43 turns about point 43', while the draw-rod 44 is guided at 44'. The free end of the lever 43 is in sliding engagement with an eccentric 42 which is likewise mounted on shaft 2. Lever 43 is held in operative connection with the said eccentric 42 by means of spring 40' which is connected at its other end to a lever 40. The arm 19 is provided with a forwardly tapered element 22 which is solidly attached to the arm 18 and serves as a stretching element. The element 22 is adapted to engage, upon the forward movement of the arm 19, the projections 28 of the blades 10 carried by the wall 9 of the plate carrying casing. The purpose of this element 22 is to enter between a pair of blades and force the same apart in order to facilitate the insertion of a plate. However, instead of solidly attaching the element 22 to the arm 19, I prefer to construct element 22 as shown in Figs. 3, 3A and 3B of the drawings. According to these figures, the element 22 comprises a projection 30 and is pivotally mounted on the arm 19 short of the edge of tooth 18. Arm 19 is provided with a spring 32 urging the projection 30 of the element 22 upwardly as shown in Fig. 3B. A stop 31 provided on the casing 1 serves to engage the projection 30 of element 22. The projection 30 is pressed against the stop 31 and takes the position m (Fig. 3) when the tooth 18 engages the gear 14 and causes the counterclockwise rotation of the plate carrying casing 9, 9', 9". During this counter-clockwise movement, the projection 30 becomes disengaged from the stop 31 and, due to the spring 32, the element 22 is rocked, taking the position n' shown in Fig. 3B. The purpose of this rocking movement is to withdraw the element 22 from between the projections 28 of the preceding pair of blades 10 carrying the exposed photographic plate. Thus, the next following fresh plate can be withdrawn from between the next two blades of the casing without obstruction.

The operation of the device is as follows:

The plate carrying casing 9, 9', 9" is first loaded by inserting plates through the aligned slots 12 provided in the casing 1 and the cylinder drum 6. The plates are placed between the blades 10 and 11 as shown in Fig. 1.

When all the plates are in position, operation of the camera can begin from the initial position shown in Figs. 2, 4, and 5. In this position the extractor arm 25 lies on the glass back of the first photographic plate which is disposed in alignment with the guides 29. The finger 27 of the arm 25 extends beyond the far edge of the plate thereby engaging the same. Movement of the cam 33 will displace the pin 35 of the lever 24 causing axial displacement of the sleeve 23 which will move from right to left (Fig. 4) thereby carrying along the photographic plate engaged by finger 27. During this withdrawal movement the plate will be guided by the blades 10 and 11 until it reaches the guides 29 of the camera. Movement of the extractor arm 25 continues until the plate is in proper position in the camera. The steps described in the foregoing are illustrated in detail in Figures 5 and 5A of the drawings. In the meantime, the eccentric 39 will act upon levers 40 and 41 and shift the arm 19 from right to left (Fig. 4), whereby the tooth 18 is removed from engagement with the gear 14 of the plate carrying casing 9, 9', 9''. Concurrently therewith, the cam 38 causes the disengaged lever 19 to move in clockwise direction. As a result of this movement of lever 19 the extractor arm 25, which is in operative engagement with arm 19 by means of groove 25'', is raised, the finger 27 sliding out of engagement with the photographic plate, which remains resting upon guides 29, as shown in Fig. 5B. In this position, one edge of the plate is in contact with the small depending lever 26 of the arm 25. Upon further rotation of the actuating shaft 2 the sleeve 23 and with it the extractor 25 is moved from left to right (Fig. 4), whereby the depending lever 26 shoves the photographic plate back and returns the same to its original position in the plate carrying casing 9, 9', 9''. Concurrently therewith, the free end of the raised arm 25 moves over the glass back of the next following photographic plate whereupon, at the end of its movement, the hingedly secured finger 27 drops due to gravity thereby engaging the plate (Fig. 5C). Simultaneously with the preceding operation the eccentric 39 actuates the levers 40, 41 which in turn move the arm 19 back into engagement with the gear 14 of plate casing 9, 9', 9''. Upon further rotation of the driving shaft 2, the arm 19 is moved under the influence of lever 36 and pin 37 in counter-clockwise direction so as to place the engaged plate in alignment with slots 12 and guides 29 of the camera (Fig. 5D).

While arm 19 is moved into engagement with gear 14, as above described, the element 22 is carried along and forced between adjacent blades 10 of the plate carrying casing 9, 9', 9''. As a result the blades 10 thus forced apart are spread out facilitating the insertion of the photographic plate upon its return movement from the camera.

During the foregoing operation the step-wise rotation of the plate carrying casing 9, 9', 9'' is controlled and safeguarded by the pawl 16 which intermittently engages the gear 15 provided on the wall 9 of the plate carrying casing. The operation of the pawl 16 is controlled by the levers 17, 44 and 43 which are actuated by the cam 42 on the actuating shaft 2. The latter may be driven by any known means.

Figure 6 illustrates the shape of the cam groove required for producing the movement of the extractor arm 25 illustrated in Figs. 5 to 5D.

In the foregoing a preferred embodiment of the present invention has been illustrated and described. However, it will be obvious that various alterations may be made without departing from the spirit and scope of the present invention and I do not wish to be understood as limiting myself to the exact details shown and described herein except as set forth in the appended claims.

I claim:

1. In an automatic aerophotographic plate camera, a dark chamber having a horizontal slot in a wall thereof, spaced guides within the chamber for receiving a plate to be exposed, a cylindrical plate magazine arranged with its axis horizontal and substantially on a level with said slot, an annular plate carrier co-axially mounted for rotation within said magazine, a plurality of circumferentially spaced tongues provided on said carrier for holding a plurality of plates in radial planes, whereby said plates may be brought successively into alignment with said slot, and a plate extractor mounted in said chamber for reciprocal movement through said slot, said extractor being provided with means for engaging the proximate and remote edges of a plate so as to withdraw it from the magazine and subsequently return it thereto.

2. In an automatic aerophotographic plate camera, a dark chamber having a horizontal slot in a wall thereof, spaced guides within the chamber for receiving a plate to be exposed, a cylindrical plate magazine arranged with its axis horizontal and substantially on a level with said slot, an annular plate carrier coaxially mounted for rotation within said magazine, a plurality of circumferentially spaced tongues provided on said carrier for holding a plurality of plates in radial planes, whereby said plates may be brought successively into alignment with said slot, and a plate extractor mounted in said chamber for reciprocal movement through said slot, said extractor being provided with a hooked end for engaging the remote edge of a plate whereby the plate may be withdrawn edgewise from said magazine into said chamber.

3. In an automatic aerophotographic plate camera, a dark chamber having a horizontal slot in a wall thereof, spaced guides within the chamber for receiving a plate to be exposed, a cylindrical plate magazine arranged with its axis horizontal and substantially on a level with said slot, an annular plate carrier coaxially mounted for rotation within said magazine, a plurality of circumferentially spaced tongues provided on said carrier for holding a plurality of plates in radial planes, whereby said plates may be brought successively into alignment with said slot, and a plate extractor mounted in said chamber for reciprocal movement through said slot, said extractor being provided with a hooked end for engaging the remote edge of a plate whereby the plate may be withdrawn edgewise from said magazine into said chamber, said extractor being also provided with a lateral projection adapted to bear against the proximate edge of said plate so that said plate may be subsequently pushed back into said magazine.

4. In an automatic aerophotographic plate camera, a dark chamber having a horizontal slot in a wall thereof, spaced guides within the chamber for receiving a plate to be exposed, a cylindrical plate magazine arranged with its axis horizontal and substantially on a level with said slot, an annular plate carrier coaxially mounted for rotation within said magazine, a plurality of circumferentially spaced tongues provided on said carrier for holding a plurality of plates in radial planes, whereby said plates may be brought successively into alignment with said slot, a plate extractor mounted in said chamber for reciprocal movement through said slot, and means for rotating the plate carrier intermittently to advance said plates successively into alignment with said slot and hence into the range of action of said extractor.

5. In an automatic aerophotographic plate camera, the combination set forth in claim 4, together with means for reciprocating said extractor in timed relation to the rotation of the plate carrier.

6. In an automatic aerophotographic plate camera, the combination set forth in claim 1, together with means operable in timed relation to the extractor movement for spreading the tongues between which the plate returned by the extractor is to be inserted.

7. In an automatic aerophotographic plate camera, the combination set forth in claim 1, together with means operable in timed relation to the extractor movement for spreading the tongues between which the plate returned by the extractor is to be inserted, said last-named means comprising a wedge mounted for reciprocation parallel to the extractor movement.

8. In an automatic aerophotographic plate camera, a pair of dark chambers, each having a substantially horizontal slot in a wall thereof, said slots being substantially in alignment, spaced guides within each chamber for receiving a plate to be exposed, a pair of axially aligned cylindrical plate magazines arranged with their axes horizontal and substantially on a level with said slots, an annular plate carrier coaxially mounted for rotation within each magazine, a plurality of circumferentially spaced tongues provided on each carrier for holding a plurality of plates in radial planes, whereby the plates of one carrier may be brought successively into alignment with one slot while the plates of the other carrier may be brought successively into alignment with the other slot, and a plate extractor in each chamber mounted for reciprocal movement through the slot in said chamber.

9. In an automatic aerophotographic plate camera, the combination set forth in claim 8, together with a common means for intermittently rotating said carriers and reciprocating said extractors.

ERMENEGILDO SANTONI.